United States Patent
Greven et al.

(10) Patent No.: US 11,834,128 B2
(45) Date of Patent: Dec. 5, 2023

(54) PEDELEC BOTTOM-BRACKET DRIVE UNIT

(71) Applicant: SRAM, LLC, Chicago, IL (US)

(72) Inventors: Dietmar Greven, Dormagen (DE); Kai Venhoff, Rhede (DE); Axel Hemsing, Duesseldorf (DE); Peter Thiele, Lauffen A.N. (DE)

(73) Assignee: SRAM, LLC, Chicago, IL (US)

( * ) Notice: Subject to any disclaimer, the term of this patent is extended or adjusted under 35 U.S.C. 154(b) by 116 days.

(21) Appl. No.: 17/425,324

(22) PCT Filed: Dec. 19, 2019

(86) PCT No.: PCT/EP2019/086192
§ 371 (c)(1),
(2) Date: Jul. 23, 2021

(87) PCT Pub. No.: WO2020/151889
PCT Pub. Date: Jul. 30, 2020

(65) Prior Publication Data
US 2022/0089250 A1    Mar. 24, 2022

(30) Foreign Application Priority Data

Jan. 25, 2019 (EP) .................... 19153759

(51) Int. Cl.
*B62M 3/00* (2006.01)
*B62K 19/34* (2006.01)
(Continued)

(52) U.S. Cl.
CPC ............. *B62M 3/003* (2013.01); *B62K 19/34* (2013.01); *B62M 6/40* (2013.01); *B62M 6/55* (2013.01)

(58) Field of Classification Search
CPC B62K 19/34; B62K 2022/00; B62K 2024/00; B62K 2202/00; B62K 2204/00;
(Continued)

(56) References Cited

U.S. PATENT DOCUMENTS 2,743,783 A * 5/1956 Kreidler ................... B62M 6/20
180/205.2
4,412,597 A * 11/1983 Aiba ........................ B62M 7/02
248/596
(Continued)

FOREIGN PATENT DOCUMENTS

DE    20 2014 101 083 U1    7/2015
DE    10 2016 112 778 A1    1/2017
(Continued)

*Primary Examiner* — Anne Marie M Boehler
(74) *Attorney, Agent, or Firm* — Norman B. Thot

(57) ABSTRACT

A pedelec bottom bracket drive unit includes a rigid drive housing and a tolerance compensation sheet-metal spring which is arranged to stand substantially in a vertical plane. The tolerance compensation sheet-metal spring includes at least one fixing point at a housing side and at least one mounting point for fastening the tolerance-compensating sheet-metal spring to a pedelec-frame-side drive mount. The at least one fixing point has a fixing point traverse axis. The tolerance compensation sheet-metal spring is fixed to the rigid drive housing at the at least one fixing point at the housing side. The at least one mounting point has a mounting point traverse axis. The at least one mounting point is arranged offset with respect to a next adjacent fixing point of the at least one fixing point as viewed from the fixing point traverse axis and from the mounting point traverse axis.

8 Claims, 3 Drawing Sheets

(51) Int. Cl.
*B62M 6/40* (2010.01)
*B62M 6/55* (2010.01)

(58) Field of Classification Search
CPC .......... B62M 3/003; B62M 6/40; B62M 6/55;
B62M 6/20
USPC ................ 180/205.4, 206.1, 206.4, 228, 220
See application file for complete search history.

(56) References Cited

U.S. PATENT DOCUMENTS

| | | |
|---|---|---|
| 2013/0032425 A1 | 2/2013 | Lee et al. |
| 2015/0007689 A1 | 1/2015 | Chonan |
| 2016/0194053 A1* | 7/2016 | Preining ................ B62K 13/00 |
| | | 310/91 |
| 2017/0016526 A1 | 1/2017 | Watarai et al. |
| 2017/0314593 A1 | 11/2017 | Mano |
| 2021/0269119 A1* | 9/2021 | Boehnke ................. B62M 6/55 |

FOREIGN PATENT DOCUMENTS

| | | |
|---|---|---|
| DE | 10 2017 201 617 A1 | 8/2018 |
| EP | 3 239 029 A1 | 11/2017 |

* cited by examiner

PEDELEC BOTTOM-BRACKET DRIVE UNIT

CROSS REFERENCE TO PRIOR APPLICATIONS

This application is a U.S. National Phase application under 35 U.S.C. § 371 of International Application No. PCT/EP2019/086192, filed on Dec. 19, 2019 and which claims benefit to European Patent Application No. 19153759.6, filed on Jan. 25, 2019. The International Application was published in German on Jul. 30, 2020 as WO 2020/151889 A1 under PCT Article 21(2).

FIELD

The present invention relates to a pedelec bottom bracket drive unit which is mountable to a pedelec frame.

BACKGROUND

The typical pedelec bottom bracket drive unit has, among other things, a bottom bracket shaft oriented in the transverse direction, i.e., transversely to the direction of travel, to each of whose longitudinal ends a pedal crank with a pedal is attached. The pedelec rider transmits very high static and in particular dynamic forces to the bottom bracket drive unit via the pedals, the pedal cranks, and the bottom bracket shaft. The bottom bracket drive unit must therefore be mounted and fixed to the pedelec frame via a strong and robust connection.

The manufacturer of the pedelec bottom bracket drive unit is typically not identical with the manufacturer of the pedelec frame, so that the frame-side drive mount can have inaccuracies and tolerances that make a gap-free mounting of the bottom bracket drive unit on or in the drive mount difficult or impossible. For a firm assembly of the bottom bracket drive unit on the pedelec frame, a tolerance compensation means must be provided that permanently provides a wear-free transmission of high dynamic and static forces.

DE 10 2016 112 778 A1, DE 10 2017 201 617 A1 and EP 3 239 029 A1 each describe a bottom bracket drive unit that uses sleeve-like tolerance compensation pull bodies to bridge the mounting gap between a fixing point on the drive housing side and a drive mount on the pedelec frame side. If a relatively large gap to be bridged between the drive mount and the bottom bracket drive unit exists, the high dynamic and static forces on the tolerance compensation pull bodies can lead to a loosening and ultimately to a breakage.

SUMMARY

An aspect of the present invention is to provide a bottom bracket drive unit with a tolerance compensation arrangement that can permanently withstand high dynamic forces.

In an embodiment, the present invention provides a pedelec bottom bracket drive unit which includes a rigid drive housing and a tolerance compensation sheet-metal spring which is arranged to stand substantially in a vertical plane. The tolerance compensation sheet-metal spring comprises at least one fixing point at a housing side and at least one mounting point for fastening the tolerance-compensating sheet-metal spring to a pedelec-frame-side drive mount. The at least one fixing point comprises a fixing point traverse axis. The tolerance compensation sheet-metal spring is fixed to the rigid drive housing at the at least one fixing point at the housing side. The at least one mounting point comprises a mounting point traverse axis. The at least one mounting point is arranged offset with respect to a next adjacent fixing point of the at least one fixing point as viewed from the fixing point traverse axis and from the mounting point traverse axis.

BRIEF DESCRIPTION OF THE DRAWINGS

The present invention is described in greater detail below on the basis of embodiments and of the drawings in which.

DETAILED DESCRIPTION

Figure 1:
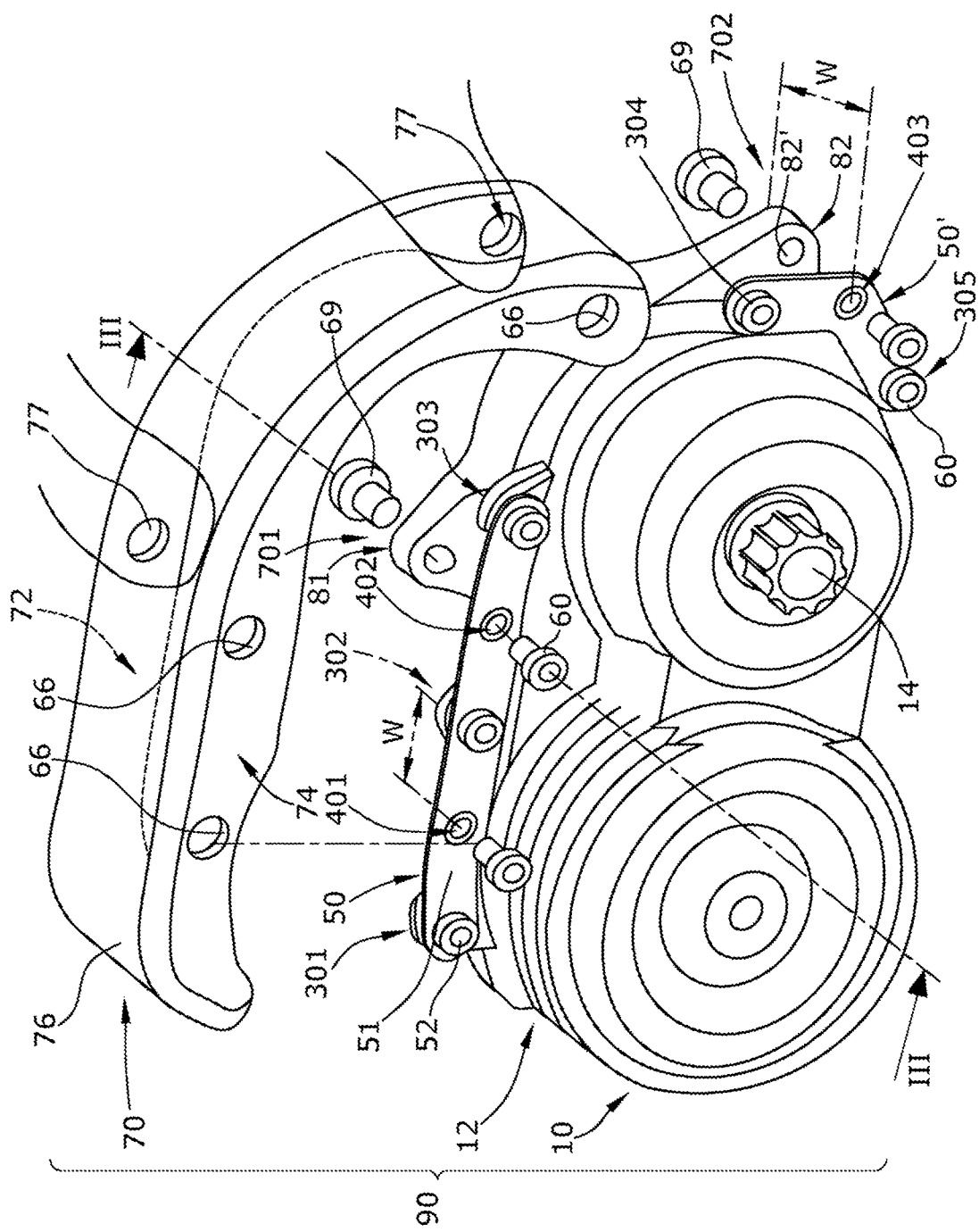
FIG. 1 shows a perspective view of a pedelec bottom bracket drive unit and a drive mount of a pedelec frame.

The pedelec bottom bracket drive unit according to the present invention comprises a rigid drive housing to which a tolerance compensation sheet metal spring standing essentially in a vertical plane is fixed at at least one fixing point on the drive housing side. The sheet metal spring does not, however, necessarily stand completely in a single vertical plane. When viewed from above, the sheet metal spring can also have a wave-like form, for example, so that it stands approximately in a vertical plane at each point, whereby these vertical planes can intersect or can be parallel to each other. A tilting of the vertical plane in question relative to the earth vertical by a maximum of 5-10° is also still a vertical plane within the meaning of the present invention. The tolerance compensation sheet metal spring can, for example, be located in a vertical plane extending approximately in the longitudinal direction of the pedelec frame.

The tolerance compensation sheet-metal spring has at least one mounting point for fastening to a pedelec frame-side flange-type drive mount. The mounting point is arranged with its transverse axis offset from the next fixing point at the housing side. A transverse axis is understood to be any axis that is oriented approximately perpendicular to the longitudinal extension or the longitudinal direction of the pedelec frame. The mounting point(s) are therefore not arranged coaxially to the fixing point(s), the mounting point(s) are much rather always arranged longitudinally and/or vertically spaced apart from the fixing point(s).

Between a fixing point and the adjacent mounting point, a section of the tolerance-compensating sheet metal spring extending approximately in the longitudinal direction is thus provided which compensates for the mounting gap between the drive mount and the bottom bracket drive unit in this zone via its elastic flexibility. Since the sheet metal spring is oriented with its base plane substantially vertically, it can transmit very high vertical forces typical of a pedelec bottom bracket drive unit even with a relatively small vertical extension of, for example, 10 mm, and a relatively small sheet metal thickness in the low single-digit millimeter range. Since the sheet metal spring is a spring element, the sheet metal spring can in particular absorb high dynamic force peaks, so that the risk of loosening or breaking of the connections involved is considerably reduced.

The sheet metal spring is fixed in a suitable way to the fixing point on the housing side, whereby the fixing can be a positive form fit, a force-fitting connection and/or a positive substance jointing. The sheet metal spring can, for example, be fixed to the fixing point via a screw connection.

At the mounting point, an opening can, for example, be provided in the sheet metal spring so that the sheet metal spring can be mounted and fixed to the drive mount with a threaded bolt, threaded screw, or similar fastening element.

The offset between the transverse axis of the housing-side sheet-metal spring fixing point and the transverse axis of the next adjacent mounting point of the sheet-metal spring can, for example, be at least 10.0 mm, for example, at least 15.0 mm. The larger the offset, the more tolerance compensation the metal spring can provide. The torsion of the metal spring increases, however, with increasing offset in the case of vertical force application, so that the offset of the transverse axes should always be as small as possible.

The longitudinal extension of the sheet metal spring can be oriented horizontally, vertically, or at an angle in between. The sheet metal spring need not, however, necessarily be formed as a straight sheet metal strip, but can, for example, be arc-shaped, angled, triangular, rectangular, or otherwise polygonal.

In an embodiment, the present invention provides that the sum of all fixing points and of all mounting points of a single tolerance compensation sheet-metal spring together is at least three, whereby at least one fixing point and at least one mounting point is always provided. Several tolerance compensation sheet-metal springs can be provided at the bottom bracket drive unit.

The drive housing can, for example, be provided with a separate rigid stop flange which can be fixed directly and without a gap in the transverse direction to a rigid stop flange of the drive mount. The flange plane of the drive housing stop flange or the boundary plane between the drive housing stop flange and the drive mount stop flange is arranged approximately in a vertical longitudinal plane which is offset in the transverse direction by at least 10 mm from the vertical base plane of the tolerance compensation sheet-metal spring. The two stop flanges, which are connected to each other without a gap, thus define to a certain extent a fixed bearing, whereas the tolerance compensation sheet-metal spring, which is spaced apart in the transverse direction, is part of a floating bearing which bridges the assembly gap resulting from manufacturing tolerances of the drive mount and the drive housing, as well as from temperature-caused expansion differences.

The tolerance compensation sheet-metal spring can, for example, have an extension crimp between a fixing point and the adjacent mounting point which allows for a stretching of the sheet metal spring section between the fixing point and the adjacent mounting point within certain limits. The extension crimp provides that no significant static stretching forces of the sheet-metal spring can occur after the bottom bracket drive unit is mounted in the drive mount, which can occur, for example, in the case of relatively large gaps or in the case of temperature-related changes in the length of the sheet-metal spring.

At least two separate tolerance compensation sheet-metal springs can, for example, be provided. A first tolerance-compensating sheet metal spring can, for example, be provided which is oriented essentially in the longitudinal direction of the pedelec, which transmits the vertical forces. A second tolerance-compensating sheet metal spring can be arranged offset in height from the first sheet-metal spring in order to support the torques generated by the vertical forces around the longitudinal axis of the pedelec. This reduces the torsion of the first sheet metal spring to a minimum.

In an embodiment of the present invention, an output sprocket can, for example, be provided via which the total output torque of the bottom bracket drive unit is transmitted to a drive chain, a drive belt, or a cardan shaft. The longitudinal plane of the drive housing stop flange is arranged closer to the output sprocket than the vertical plane of the sheet metal spring. This provides that most of the forces introduced via the output sprocket are transmitted from the bottom bracket drive unit to the drive housing via the stop flange connection.

An embodiment of the present invention is explained in greater detail below under reference to the drawings.

Figure 3:
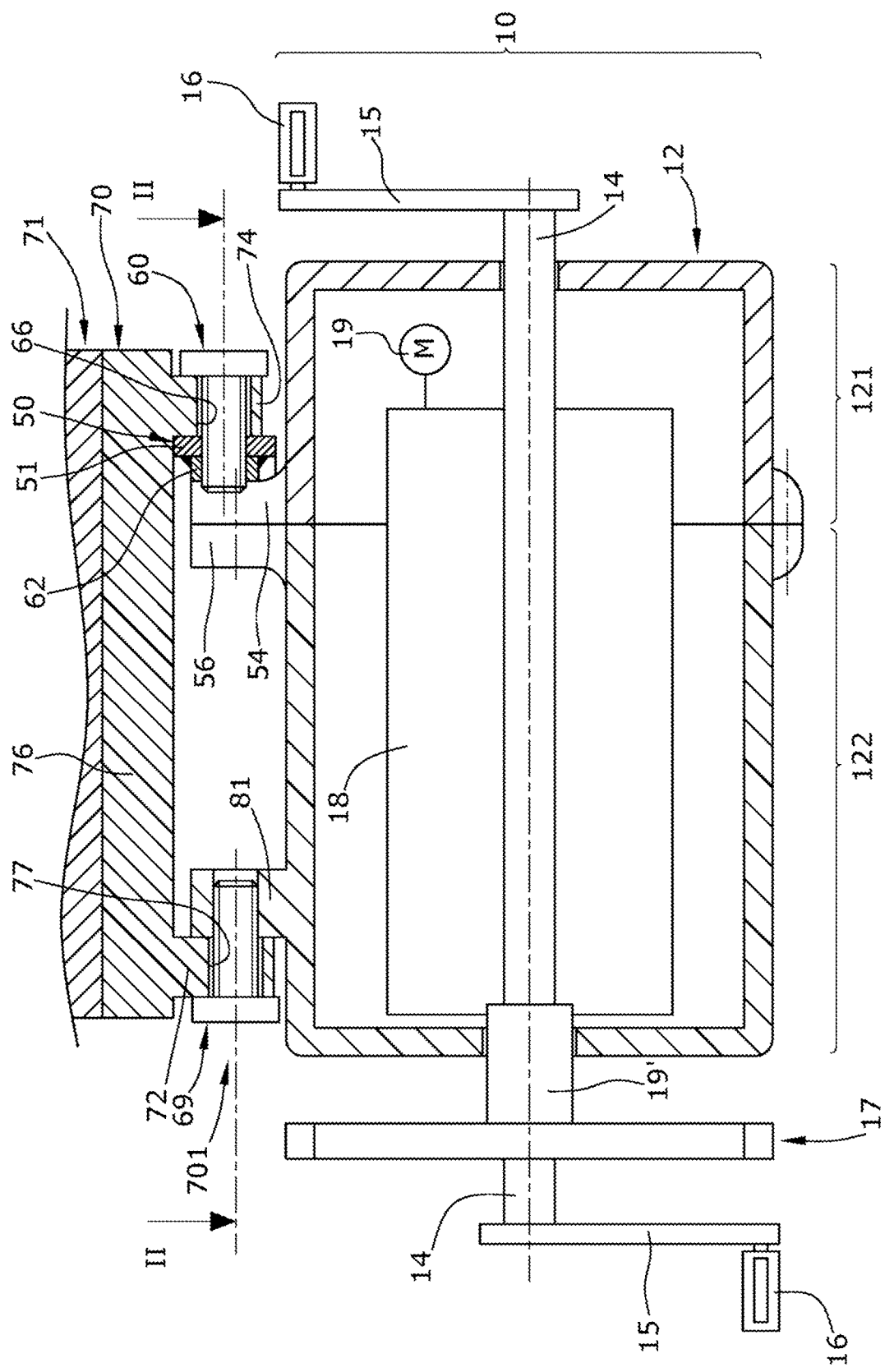
FIG. 3 shows a vertical cross-section of the pedelec bottom bracket drive unit mounted at the drive mount in FIG. 1.

FIG. 1 shows a pedelec bottom bracket drive unit 10 which is ready to be mounted in a pedelec frame-side drive mount 70. The pedal drive unit 10 has a rigid drive housing 12 in which an electric drive motor 19 and a summing gear 18 are arranged, as is shown in FIG. 3. The bottom bracket drive unit 10 also has a transversely oriented bottom bracket shaft 14 which is rotatably mounted in the bottom bracket drive unit 10. At each of the two longitudinal ends of the pedal bearing bottom bracket shaft 14, a pedal crank 15, which is non-rotating or is rotating in a vertical longitudinal plane, including a pedal 16, is provided. The bottom bracket drive unit 10 also has a hollow output shaft 19' which is connected torque proof to an output sprocket 17, via which the output torque can be transmitted to a pedelec rear wheel via a chain.

FIG. 1 shows a perspective view of an overall arrangement 90 consisting of the bottom bracket drive unit 10 and the rigid pedelec frame-side drive mount 70 before the bottom bracket drive unit 10 is mounted at the pedelec frame-side drive mount 70. The pedelec frame-side drive mount 70 has a U-shaped profile that is approximately open at the bottom in cross-section, as can be seen in particular in FIG. 3. The pedelec frame-side drive mount 70 has a transversely extending drive mount base body 76, a mount stop flange 72 defining a fixed bearing, and a floating bearing flange 74. The drive mount base body 76 is permanently connected, for example, welded, to a pedelec frame part 71 of the pedelec frame.

The drive mount base body 76 holds the mount stop flange 72, which is lying in a longitudinal vertical plane and defines a fixed bearing, and the floating bearing flange 74, which is parallel thereto, is spaced apart in the transverse direction and is also lying in a longitudinal vertical plane. The mount stop flange 72 and the floating bearing flange 74 each have a plurality of fastening openings 66, 77 passing therethrough in the transverse direction, through which the bottom bracket drive unit 10 can be fixed in or at the pedelec frame-side drive mount 70 by fastening screws 69, 60.

A first tolerance compensation sheet-metal spring 50 standing approximately in a longitudinal-vertical plane and a second tolerance compensation sheet-metal spring 50' also standing approximately in a vertical longitudinal plane are provided or fixed to the drive housing 12 of the bottom bracket drive unit 10 for this purpose. The first tolerance compensation sheet-metal spring 50 is provided as a straight longitudinal strip and is fixed to the drive housing 12 at three fixing points 301, 302, 303 at the housing side.

Figure 2:
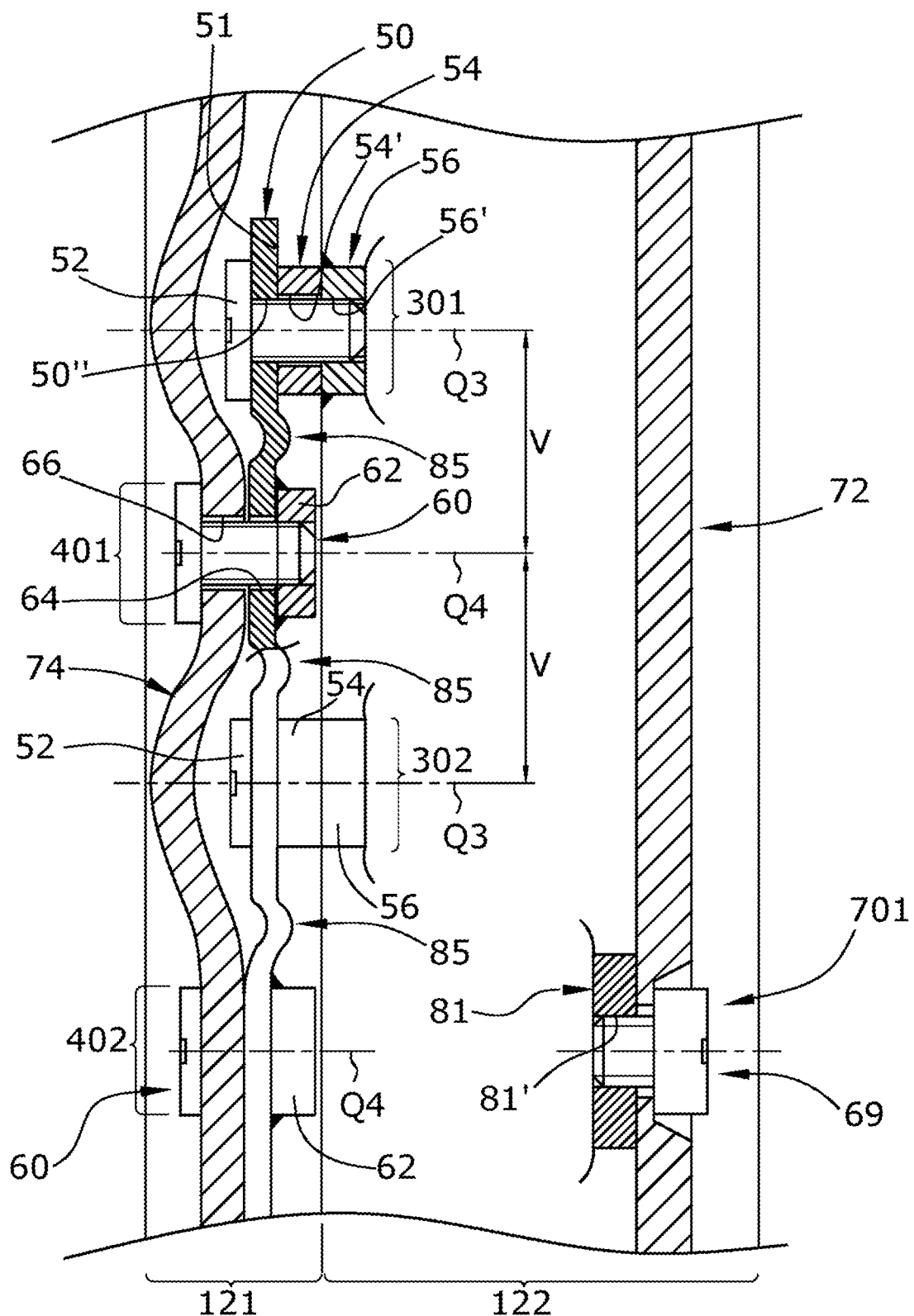
FIG. 2 shows a horizontal longitudinal section of the pedelec bottom bracket drive unit of FIG. 1 mounted at the drive mount.

The drive housing 12 comprises two housing shells 121, 122, as is shown in FIGS. 2 and 3. The two housing shells 121, 122 each have mutually corresponding flange elements 54, 56, wherein the distal fixing point flange element 54 has a respective plug-in opening 54' and the proximal flange element 56 has a respective internal thread 56'. The first tolerance compensation sheet-metal spring 50 is attached to the respective distal fixing point flange element 54 via a threaded screw 52, which is inserted through a plug-in opening 50" of the sheet-metal spring body 51 and which is screwed into the proximal flange element 56. The first tolerance compensation sheet-metal spring 50 is thereby fixed to the drive housing 12 at three fixing points 301, 302, 303 and the two housing shells 121, 122 of the drive housing 12 are screwed together at the same three fixing points 301, 302, 303.

Seen in longitudinal direction between the three fixing points 301, 302, 303, a mounting point 401, 402 is provided approximately centrally in between, via which the bottom bracket drive unit 10 can be or is fixed to the floating bearing flange 74 of the pedelec frame-side drive mount 70. As is shown in FIG. 2, the floating bearing flange 74 has an fastening opening 66 through which a fastening screw 60 is inserted from the outside, which is screwed through an insertion opening 64 of the sheet-metal spring body 51 into a threaded nut 62 which is welded proximally onto the sheet-metal spring body 51. Between a fixing point 301, 302, 303 and an assembly point 401, 402, the first tolerance compensation sheet metal spring 50, which runs slightly wavelike in plan view, has an extension crimp 85, respectively, which allows a resilient extension of the longitudinal extension of the first tolerance compensation sheet-metal spring 50 both during assembly and in operation within certain limits.

The offset V between the transverse axis Q3 of a housing-side sheet-metal spring fixing point 301, 302, 303 and the transverse axis Q4 of the respective next adjacent mounting point 401, 402, is approximately 25 mm, respectively.

The drive housing 12 has two drive housing stop flanges 81, 82 which, viewed in the transverse direction, rest directly against the mount stop flange 72 and are fixed thereto as is shown in FIGS. 2 and 3. For this purpose, the two drive housing stop flanges 81, 82 each have a threaded bore 81', 82' passing through in the transverse direction, into which threaded fastening screws 69 inserted from the outside and through the respective insertion fastening openings 77 of the mount stop flange 72 are screwed. Two fixed bearing attachment points 701, 702 are thereby defined, whereby the term "fixed bearing" refers to the mobility in the transverse direction. The lateral offset between the fixed bearing flange plane and the first tolerance compensation sheet-metal spring 50 is approximately 50 mm.

The second tolerance compensating sheet-metal spring 50' is fixed analogously to the first tolerance compensating sheet-metal spring 50 to the drive housing 12 and the floating bearing flange 74, wherein the second tolerance compensating sheet-metal spring 50' is arranged approximately in the same vertical longitudinal plane as the first tolerance compensating sheet-metal spring 50. The first tolerance compensation sheet-metal spring is provided at the top of the drive housing 12, whereas the second tolerance compensation sheet-metal spring 50' is provided at the front longitudinal end of the drive housing 12. The second tolerance compensation sheet-metal spring 50' defines two further sheet-metal spring fixing points 304, 305 and a single mounting point 403 therebetween, each of which is provided equivalent to that of the first tolerance compensation sheet-metal spring 50.

Due to the, within certain limits, transversely resilient design of the first tolerance compensation sheet-metal spring 50, the tolerance gaps between the distal side of the first tolerance compensation sheet-metal spring 50 and the proximal side of the floating bearing flange 74, which are unavoidable in practice and which vary in size, can be compensated without stress, thus simplifying the assembly of the bottom bracket drive unit 10 at the pedelec frame-side drive mount 70.

The present invention is not limited to embodiments described herein; reference should be had to the appended claims.

LIST OF REFERENCE NUMERALS

10 Bottom bracket drive unit
12 Drive housing
14 Bottom bracket shaft
15 Pedal crank
16 Pedal
17 Output sprocket
18 Summing gear
19 Electric drive motor
19' Hollow output shaft
50 First tolerance compensation sheet-metal spring
50' Second tolerance compensation sheet-metal spring
50" Plug-in opening
51 Sheet-metal spring body
52 Threaded screw
54 Distal fixing point flange element
54' Plug-in opening
56 Proximal flange element
56' Internal thread
60 Fastening screw
62 Threaded nut
64 Insertion opening
66 Fastening opening
69 Fastening screw
70 Pedelec frame-side drive mount
71 Pedelec frame part
72 Mount stop flange
74 Floating bearing flange
76 Drive mount base body
77 Fastening opening
81 Drive housing stop flange
81' Threaded bore
82 Drive housing stop flange
82' Threaded bore
85 Extension crimp
90 Overall arrangement
121 Housing shell
122 Housing shell
301 Fixing point
302 Fixing point
303 Fixing point
304 Further fixing point
305 Further fixing point
401 Mounting point
402 Mounting point
403 Mounting point
701 Fixed bearing attachment point
702 Fixed bearing attachment point
Q3 Traverse axis
Q4 Traverse axis
V Offset

What is claimed is:
1. A pedelec bottom bracket drive unit comprising:
a rigid drive housing; and
a tolerance compensation sheet-metal spring which is arranged to stand substantially in a vertical plane, the tolerance compensation sheet-metal spring comprising,
at least one fixing point at a housing side, the at least one fixing point comprising a fixing point traverse axis, the tolerance compensation sheet-metal spring being fixed to the rigid drive housing at the at least one fixing point at the housing side, and at least one mounting point for fastening the tolerance-compensating sheet-metal spring to a pedelec-frame-side drive mount, the at least one mounting point comprising a mounting point traverse axis, wherein, the at least one mounting point is arranged offset with respect to a next adjacent fixing point of the at least one fixing point as viewed from the fixing point traverse axis and from the mounting point traverse axis, the pedelec-frame-side drive mount comprises a receiving stop flange, and the rigid drive housing comprises a drive housing stop flange which is directly fixable in a transverse direction to the receiving stop flange of the pedelac frame-side drive mount, the drive housing stop flange comprising a flange plane which is arranged in a vertical longitudinal plane which is offset by at least 10 mm in a traverse direction with respect to the tolerance compensation sheet-metal spring.

2. The pedelec bottom bracket drive unit as recited in claim 1, wherein the offset is at least 15.0.

3. The pedelec bottom bracket drive unit as recited in claim 1, wherein the offset is from 10 to 25 mm.

4. The pedelec bottom bracket drive unit as recited in claim 1, wherein a sum of all of the at least one fixing point and of all of the at least one mounting point of the tolerance compensation sheet-metal spring is at least three.

5. The pedelec bottom bracket drive unit as recited in claim 1, wherein the tolerance compensation sheet metal spring further comprises an extension crimp which is arranged between one of the at least one mounting point and the next adjacent fixing point of the at least one fixing point.

6. The pedelec bottom bracket drive unit as recited in claim 1, further comprising, an output sprocket, wherein, the tolerance compensation sheet-metal spring further comprises a longitudinal vertical plane, the drive housing stop flange further comprises a longitudinal plane, and the longitudinal plane of the drive housing stop flange is closer to the output sprocket than to the longitudinal vertical plane of the tolerance compensation sheet-metal spring.

7. The pedelec bottom bracket drive unit as recited in claim 1, further comprising:

at least one second separate tolerance compensation sheet-metal spring.

8. A pedelec bottom bracket drive unit comprising:

a rigid drive housing which comprises a drive housing stop flange; and a tolerance compensation sheet-metal spring which is arranged to stand substantially in a vertical plane, the tolerance compensation sheet-metal spring comprising, at least one fixing point at a housing side, the at least one fixing point comprising a fixing point traverse axis, the tolerance compensation sheet-metal spring being fixed to the rigid drive housing at the at least one fixing point at the housing side, and at least one mounting point for fastening the tolerance-compensating sheet-metal spring to a pedelec-frame-side drive mount, the at least one mounting point comprising a mounting point traverse axis, wherein, the tolerance compensation sheet-metal spring is a part of a floating bearing, the at least one mounting point is arranged offset with respect to a next adjacent fixing point of the at least one fixing point as viewed from the fixing point traverse axis and from the mounting point traverse axis, the pedelec-frame-side drive mount comprises a receiving stop flange, and the drive housing stop flange of the rigid drive housing is directly fixable in a transverse direction to the receiving stop flange of the pedelec-frame-side drive mount so that the drive housing stop flange and the receiving stop flange together define a fixed bearing.

* * * * *